Feb. 11, 1958 H. H. VAN ABBE ET AL 2,823,269
TRANSISTOR AMPLIFIER HAVING A VARIABLE AMPLIFICATION
Filed Feb. 14, 1955
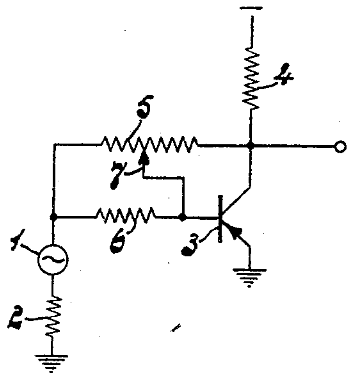
INVENTORS
HENRI HERMAN VAN ABBE
LUDOLF JENTJE COCK
BY Fred M. Vogel
AGENT

United States Patent Office 2,823,269

Patented Feb. 11, 1958

2,823,269

TRANSISTOR AMPLIFIER HAVING A VARIABLE AMPLIFICATION

Henri Herman van Abbe and Ludolf Jentje Cock, Emmasingel, Eindhoven, Netherlands, assignors, by mesne assignments, to North American Philips Company, Inc., New York, N. Y., a corporation of Delaware Application February 14, 1955, Serial No. 487,808

Claims priority, application Netherlands February 23, 1954

3 Claims. (Cl. 179—171)

The present invention relates to transistor amplifier arrangements. More particularly, the invention relates to an amplifying arrangement comprising a transistor, a signal source connected to the base electrode and a negative feedback resistor connected between the collector electrode and the signal source. It has for its object to provide an amplifying arrangement for example for use in a hearing aid apparatus, in which the amplification factor can be varied manually. This frequently gives rise to the problem that the input impedance for the signal source drops excessively, which may cause frequency distortion of the signal.

In accordance with the present invention, in order to control the amplification without a drop in the input impedance of the transistor, viewed from the signal source, to an excessively low value, the conductor connecting the signal source and the negative feedback resistor to the base electrode includes a small resistor as compared with the negative feedback resistor, and the base electrode is connected to a variable tapping point on the negative feedback resistor.

The invention will be more fully described with reference to the accompanying drawing, wherein the figure is a schematic diagram of an embodiment of the amplifying arrangement of the present invention.

In the figure, the signals to be amplified from a source 1, having an internal resistor 2, are supplied to the base electrode of a transistor 3, so that across a collector impedance 4 an amplified signal is produced, which may, if desired, be fed to a following amplifier. A negative feedback resistor 5 is connected between the collector electrode of the transistor 3 and the signal source 1.

The amplification factor may, of course, be varied, for example by varying one of the said resistors, of which resistor 5 is most suitable for variation, in order to obtain a sufficiently low output impedance of the amplifier, so that a satisfactory signal-noise ratio is maintained for a transistor connected in cascade to the amplifier 3. In this case, however, it is found that the input impedance, viewed from the signal source, is liable to drop excessively due to variation of the negative feedback factor, which gives rise to the aforesaid disadvantages.

This drop of the input impedance may be materially compensated by including in the conductor connecting the signal source 1 and the negative feedback resistor 5 to the base electrode of the transistor 3, a resistor 6, which is small with respect to the resistor 5; the base electrode is connected to a variable tapping point 7 of the resistor 5. With correct proportioning, the said input impedance may be maintained at a prescribed value through a large control-range.

In a practical embodiment the resistor 2 may have a resistance value of 1 kilohm, the resistor 4 may have a value of 10 to 20 kilohms, the resistor 5 may have a value of 500 kilohms and the resistor 6 may have a value of 1 kilohm.

While the invention has been described by means of a specific example and in a specific embodiment, we do not wish to be limited thereto, for obvious modifications will occur to those skilled in the art without departing from the spirit and scope of the invention.

What is claimed is:

1. An amplifying arrangement comprising a transistor having base and collector electrodes, a signal source, a negative feedback resistor connected between said collector electrode and said signal source, said feedback resistor having a variable tap thereon connected to said base electrode, and a circuit including a second resistor connecting said signal source and said negative feedback resistor to said base electrode, said second resistor having a value which is small with respect to the value of said feedback resistor, whereby the amplification is controlled without an excessive drop in the value of the input impedance of said transistor viewed from said signal source.

2. An amplifying arrangement comprising a transistor having base, emitter and collector electrodes, said emitter electrode being connected to a point of ground potential, a signal source having one terminal connected to said point of ground potential, a negative feedback resistor connected between said collector electrode and the other terminal of said signal source, said feedback resistor having a variable tap thereon connected to said base electrode, a circuit including a second resistor connecting the other terminal of said signal source to said base electrode, said second resistor having a value which is small with respect to the value of said feedback resistor, a source of negative potential, a third resistor connecting said source of negative potential to said collector electrode, and means for deriving an output voltage from said collector electrode whereby the amplification of said amplifying arrangement is controlled without an excessive drop in the value of the input impedance of said transistor when viewed from said signal source.

3. An amplifying arrangement comprising a transistor having a base electrode and a collector electrode, a signal source, a negative feedback resistor directly connected between said collector electrode and said signal source, a second resistor directly connected between said signal source and said base electrode, said second resistor having a value which is small relative to the value of said feedback resistor, means for short-circuiting said second resistor comprising a tap on said feedback resistor and a direct connection from said tap to said base electrode whereby an excessive drop in the value of the input impedance of said transistor viewed from said signal source is compensated, and means for deriving an output signal from said collector electrode.

References Cited in the file of this patent

UNITED STATES PATENTS 2,695,337 Burwen ---------------- Nov. 23, 1954

OTHER REFERENCES

Shea text: "Principles of Transistor Circuits," pages 341, 349–351, published 1953 by John Wiley & Sons, New York, N. Y.